United States Patent [19]

Meschkat

[11] Patent Number: 5,012,607
[45] Date of Patent: May 7, 1991

[54] ADD-ON TRIGGER WITH SAFETY FASTENER FOR FISHING ROD REEL

[76] Inventor: Bodo Meschkat, 28731 Greenwood Pl., Castaic, Calif. 91384

[21] Appl. No.: 378,314

[22] Filed: Jul. 11, 1989

[51] Int. Cl.⁵ ............................................. A01K 87/06
[52] U.S. Cl. ................................................ 43/25; 43/22
[58] Field of Search ................................. 43/22, 23, 25

[56] References Cited

U.S. PATENT DOCUMENTS

| | | | |
|---|---|---|---|
| 718,589 | 1/1903 | Treachwell | 43/22 |
| 802,027 | 10/1905 | Bishop | 43/25 |
| 834,571 | 10/1906 | Galbreath | 43/25 |
| 858,881 | 7/1907 | Letterman | 43/22 |
| 930,181 | 8/1909 | Huffman | 43/22 |
| 1,154,123 | 9/1915 | Manning | 43/22 |
| 1,331,312 | 2/1920 | Bartlett | 43/22 |
| 1,494,552 | 5/1924 | Kawell | 43/22 |
| 1,833,787 | 11/1931 | Mauss | 43/25 |
| 1,971,000 | 8/1934 | Field | 43/25 |
| 1,995,242 | 3/1935 | Clarke | 43/22 |
| 2,260,885 | 10/1941 | Crosby | 43/22 |
| 2,482,192 | 10/1949 | MacDonald | 43/25 |
| 2,498,648 | 2/1950 | Christen | 43/22 |

Primary Examiner—Kurt Rowan
Attorney, Agent, or Firm—Donald A. Streck

[57] ABSTRACT

In a fishing rod having a handle and a reel attached to the handle, the improvement comprising, a trigger-clamp having a body disposed on the handle on a side thereof opposite the reel and a finger grip extending outwardly in a direction away from the handle; and, a plurality of bolts inserted through the trigger body, one end of each of the bolts being engaged with the trigger body and the other end of each of the bolts being connected to a structural member of the reel. Preferably the other end of each of the bolts is threaded and there are plates for threadedly coupling the bolts to the reel. Also preferably, the structural member of the reel comprises a plurality of cross-bars connecting a pair of side members and the plates are disposed on the cross-bars on sides thereof opposite the trigger body.

11 Claims, 2 Drawing Sheets

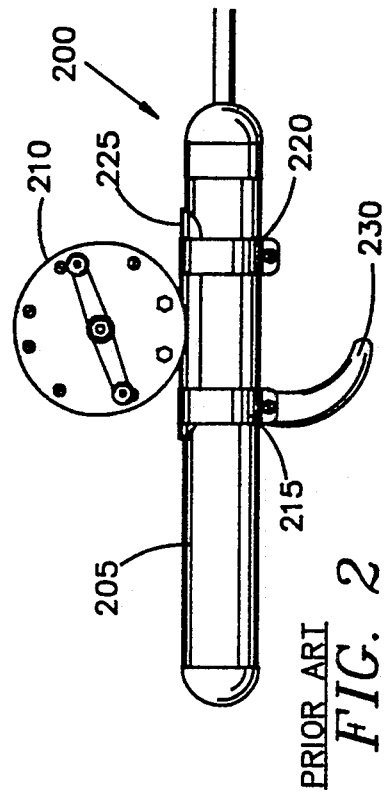
PRIOR ART
FIG. 2
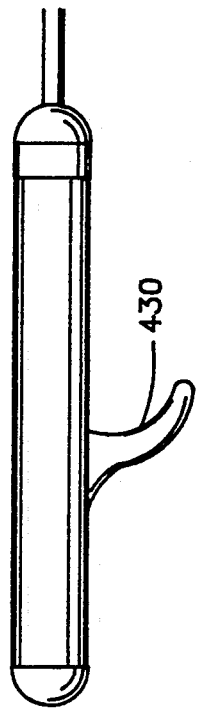
PRIOR ART
FIG. 4
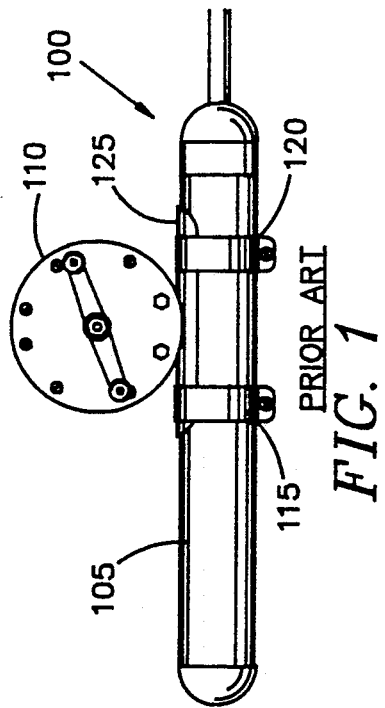
PRIOR ART
FIG. 1
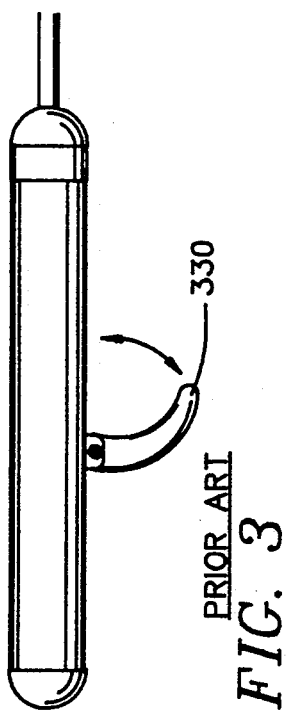
FIG. 3
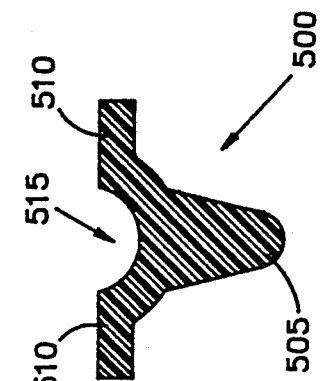
FIG. 7
FIG. 6
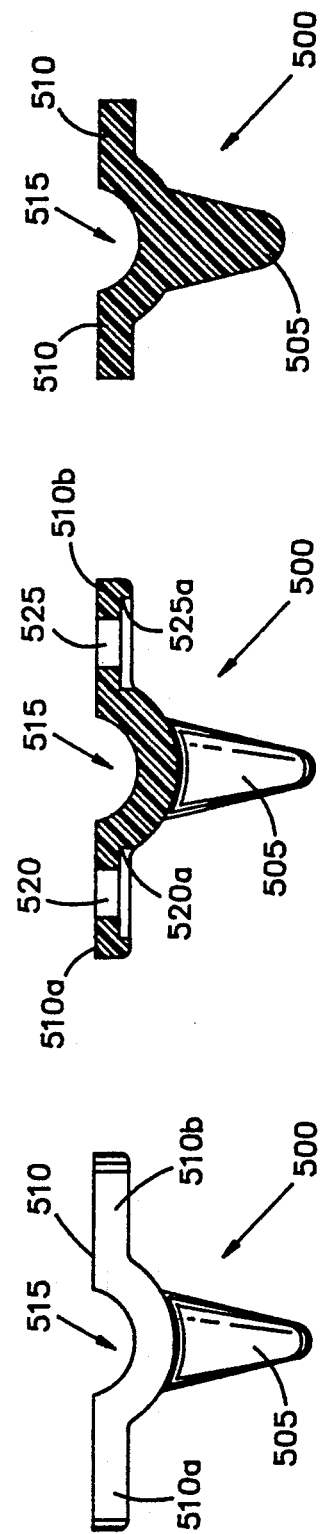
FIG. 5

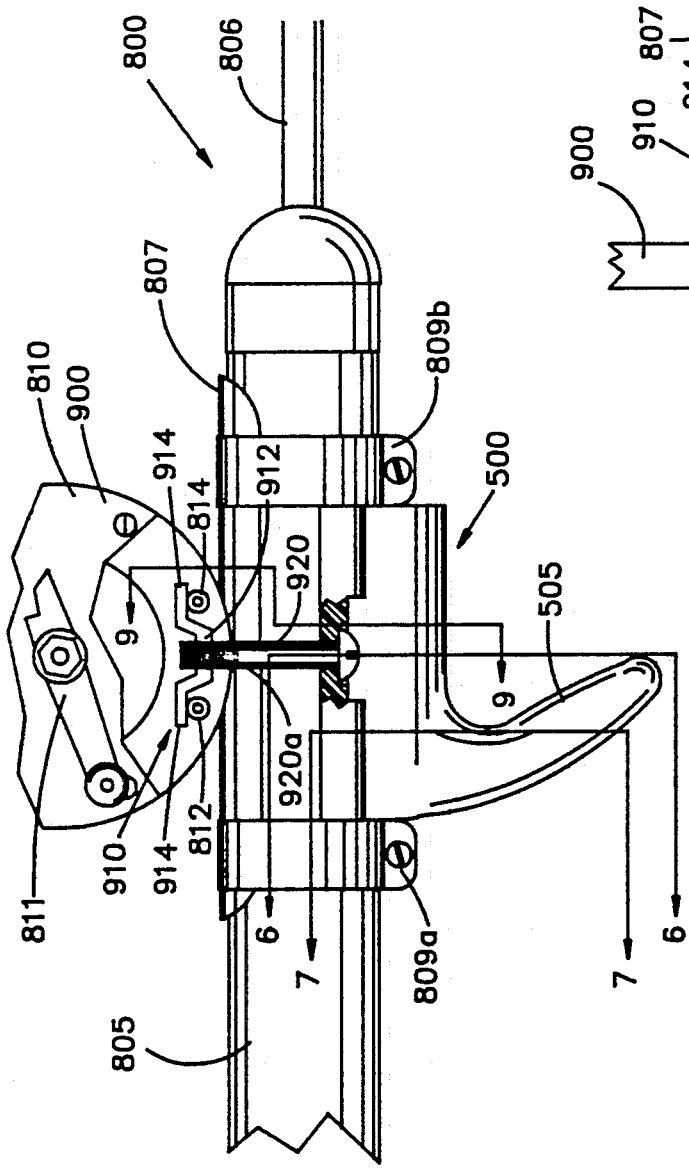
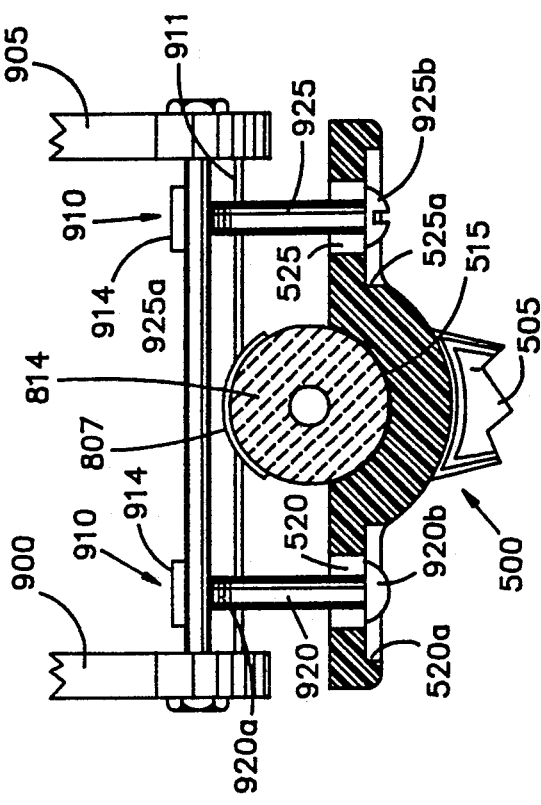
FIG. 8
FIG. 9

ADD-ON TRIGGER WITH SAFETY FASTENER FOR FISHING ROD REEL

BACKGROUND OF THE INVENTION

This invention relates to fishing equipment and, in particular, in a fishing rod having a handle member supporting a fishing reel, to the improvement comprising, a separate trigger and means for removably fastening the trigger to the reel so as to compress the rod handle member between the fishing reel and the trigger and firmly hold both the trigger and the reel to the rod handle member.

Many fishing rods are made with a handle which permits the user to select any particular reel from a wide assortment and attach it to the rod. The advantage is that the same rod may be used with many different types of reel. One such fishing rod is illustrated in FIG. 1, wherein the rod 100 has a cylindrically shaped handle 105 to which a fishing reel 110 is attached by a pair of clamps 115, 120. The clamps 115, 120 are tightly wrapped around the handle 105 and over a base 125 which is part of the reel 110 and extends therefrom for such mounting purposes. The advantage of this arrangement is that the reel 110 can be of any size or configuration as long as the clamps 115, 120 conform to the cylindrical shape of the handle 105. Thus, the rod 100 affords flexibility in choosing the type of reel to be attached to it. Also, any type of rod can have a reel attached in this manner without the necessity of the rod including built-in reel clamps. A major disadvantage is that the clamps may cut the fingers of the fisherman when the rod is used. This is particularly true when (as is quite common) worm drive radiator hose clamps are employed as the clamps 115, 120.

Another advantage of this type of fishing rod is that other accessories may also be attached to the handle 105, as desired. For example, some fishermen prefer to have a trigger on the handle for their index finger to grasp, as disclosed in U.S. Pat. No. 2,482,192 to Mac-Donald. Such an arrangement is illustrated in FIG. 2. A fishing rod 200 includes a handle 205 to which a fishing reel 210 is attached by a pair of clamps 215, 220 wrapped over its base 225 and around the handle 205. In addition to fastening the reel 210 to the rod 200, the clamp 215 is also used to attach an "add-on" trigger 230 as shown. The arrangement of FIG. 2 permits flexibility in selecting the various features to be attached to the handle 205. In an arrangement such as that of FIG. 2, the clamp 215 can experience severe stress during vigorous use of the fishing rod 200 (such as during baitcasting) because all forces on the trigger 230 and roughly half the forces on the reel must be sustained by the clamp 215. If the clamps 215, 220 and/or the base 225 fail, the reel 210 may become detached from the fishing rod 200 and lost. The disadvantage of the arrangement of FIG. 2 is that attaching the trigger 230 by means of the clamp 215 increases the stress on the clamp 215 so that it is more liable to fail during strenuous casting, a significant problem. Another problem exists where clamps such as radiator hose clamps are employed. Putting the trigger adjacent the clamp merely increases the chance of the fisherman being cut by the clamp when casting, for example.

One partial solution to this problem is to separately attach the trigger to the handle without using any of the fasteners holding the reel to the handle. This approach is exemplified in U.S. Pat. Nos. 834,571 (Galbraith), 2,018,923 (Potter), 2,186,515 (Yuncker), 2,230,229 (Benson) and 4,398,369 (Wiebe).

Regardless of the manner in which the trigger is attached to the handle or whether it is attached at all, the basic configuration illustrated in FIG. 1 suffers from a fundamental problem that the clamps 115, 120 and, primarily, base 125 are liable to failure during casting (for example) because their strength is limited by the size and method of attachment of the parts. Thus, this method of attachment provides flexibility in the choice of reel; but, limits the reliability with which the reel 110 is held to the handle 105.

One way of providing a trigger on the handle without increasing the probability of the reel to becoming detached is to permanently attach the trigger to the handle, as illustrated in FIGS. 3 and 4. This approach permits a stronger attachment of the trigger to the handle without stressing any of the fasteners holding the reel to the handle, so that the entire assembly is stronger. However, this approach does not enjoy the flexibility of the technique of FIG. 2. The permanent trigger 330 of FIG. 3 is typical of folding triggers such as those disclosed in U.S. Pat. Nos. 814,321 (Pepper), 3,229,405 (Veeder) and 4,229,898 (Urakami). The permanent trigger 430 of FIG. 4 is typical of stationary triggers such as those disclosed in U.S. Pat. Nos. 2,699,622 (Stevens), 3,451,156 (Barnes), 3,618,253 (Edwards et al.), 3,792,546 (Miller) and 4,648,195 (Kim). The patent to Stevens U.S. Pat. No. 2,699,622) discloses a trigger which is detachable by means of a pair of screws; but, which is exchangable only with those triggers having screw holes identically matching those of the original trigger so that the trigger is not an "add-on" trigger of the type illustrated in FIG. 2.

In summary, it would seem that the "add-on" flexibility with which the trigger and reel of FIG. 2 may be selected and the reliably strong fastening of the trigger to the handle exemplified in FIGS. 3 and 4 are mutually exclusive features. Thus, in the prior art approaches, there appears to be no practical way of realizing both features (flexibility and reliability) in the same fishing rod assembly. Therefore, it is recognized in the present invention that there is a need to provide a fishing rod in which both features are realized.

There is also a need to enhance the strength with which a removable reel (such as that illustrated in FIG. 1) is fastened to the handle of the fishing rod.

Accordingly, it is an object of the present invention to provide a fishing pole assembly having an "add-on" trigger which is reliably fastened to the handle of the fishing pole without detracting from the strength with which the fishing reel is attached to the handle.

It is also an object of the invention to provide a fishing rod assembly having an "add-on" trigger which is not only itself reliably fastened to the handle; but, which also supplements the strength with which the fishing reel is attached to the handle.

It is a further object of the invention to provide an "add-on" trigger having a fastening device which not only reliably holds the trigger to the rod handle but further strengthens the fastening of the reel to the handle.

It is a still further object of the invention to provide a fastening device for an "add-on" trigger which fastens to a major structural member of the fishing reel so as to enhance the strength with which both the trigger and the reel are held to the rod handle.

It is still another object of the invention to provide a fastening device for an "add-on" trigger which fastens to the fishing reel so as to compress the fishing rod handle between the trigger fastening device and the reel.

It is yet a further object of the invention to provide a fastening device for an "add-on" trigger which fastens to at least one of the bottom cross-bars of the fishing reel so as to compress the fishing pole handle between the trigger fastening device and the reel.

It is yet another object of the invention to provide, in a fishing rod having a reel attached to its handle by fastening grips, a fastening device for an "add-on" trigger which fastens to at least one of the bottom cross-bars of the fishing reel so as to compress the fishing rod handle between the trigger fastening device and the base of the reel and thereby supplement the fastening grips of the reel.

It is yet a further object of the invention to provide an "add-on" trigger which also securely fastens the fishing reel to the fishing pole handle thereby eliminating the necessity for separate clamps otherwise required for that purpose.

Other objects and benefits of the invention will become apparent from the description which follows when taken in conjunction with the drawing figures which accompany it.

SUMMARY OF THE INVENTION

The foregoing objects have been achieved in a fishing rod having a handle member supporting a fishing reel, by the add-on trigger-clamp of the present invention comprising, a trigger body; and, means for removably fastening the trigger body to a structural cross-member of the reel so as to compress the rod handle member between the fishing reel and the trigger body and firmly hold both the trigger body and the reel to the rod handle member.

In the preferred embodiment, the rod handle member is cylindrical and the fishing reel is attached to a partially cylindrical base conforming to the rod handle member; and, the trigger body comprises, a trigger base, a finger grip extending out from the base in a first direction, and a partial cylindrical recess in the base in a side thereof opposite the finger grip wherein the rod handle member nests between the partial cylindrical reel base and the partial cylindrical recess. Additionally, the means for fastening comprises a pair of bolts coupled to the trigger base and to the reel; and, the trigger base comprises a pair of wings extending in opposite directions therefrom, each of the wings having a hole through which a respective one of the bolts is inserted. Preferably the reel comprises a pair of side members coupled together by a plurality of stationary cross-bars comprising structural cross-members of the reel and the bolts are coupled to at least one of the cross-bars.

DESCRIPTION OF THE DRAWINGS

FIG. 1 is a side view of the handle portion of a fishing rod of the prior art showing how the reel is clamped to the rod.

FIG. 2 is a side view of the handle portion of a fishing rod of the prior art having an add-on trigger.

FIG. 3 is a side view of the handle portion of a fishing rod of the prior art having a permanent folding trigger incorporated therein.

FIG. 4 is a side view of the handle portion of a fishing rod of the prior art having a permanent stationary trigger formed therein.

FIG. 5 is an end view of an add-on trigger assembly in accordance with the present invention.

FIG. 6 is a first cross-sectional view of the trigger assembly of FIG. 5.

FIG. 7 is a second cross-sectional view of the trigger assembly of FIG. 5.

FIG. 8 is a partially cut-away side view of the handle portion of a fishing rod with reel attached and held in place by the add-on trigger of FIG. 5 in accordance with this invention.

FIG. 9 is a partially cut-away end view of the assembly of FIG. 8 showing how the trigger of this invention fastens to the structurally secure cross-bars of the reel.

DESCRIPTION OF THE PREFERRED EMBODIMENT

The trigger-clamp of the present invention now to be described is now being marketed commercially under the trademark Trig'rr Clamp. Such marketing and sales began less than one year before the filing date of this application. Referring now to FIG. 5, the add-on trigger-clamp 500 of the present invention includes a finger grip 505 and a fastening base 510. The fastening base 510 has a semicylindrical recess 515 on its top surface opposite the finger grip 505 in which the cylindrically-shaped handle of a fishing rod may nest.

Referring to the cross-sectional view of FIG. 6, the fastening base 510 includes a pair of screw holes 520, 525 disposed symmetrically with respect to the finger grip 505 in respective opposing outwardly extending wings 510a and 510b of the fastening base 510. Each hole 520, 525 has a screw head-receiving space 520a, 525a, respectively. FIG. 7 illustrates a cross-sectional view of the preferred embodiment in which the finger grip 505 and the fastening base 510 are integrally formed together. It should be noted that in the commercial embodiment as referred to above, the holes 520, 525 and corresponding screw head-receiving spaces 520a, 525a are elongated from front to back to provide more versatility in attaching the trigger-clamp 500 to various rods and reels. Such elongated holes are, therefore, preferred.

FIGS. 8 and 9 show how the add-on trigger-clamp 500 of FIG. 5 is fastened to the cylindrical handle 805 and reel 810 of a fishing rod 800. The fishing rod 800, of course, has an elongate flexible pole 806 attached to the handle 805 in the usual manner. Likewise, the reel 810 has the usual rotatable handle 811 for winding the fishing line (not shown) around the reel 810. Also in the usual manner, the reel 810 is carried by a fastening base 807 which, in turn, can be held to the handle 805 by a pair of fastening clamps 809a, 809b wrapped tightly over the base 807 and around the handle 805. Other types of clamps as are well known in the art could be employed to fasten the base 807 to the handle 805, if desired. The trigger-clamp 500 can also be employed as the primary mode of fastening the reel 810 to the rod 800. Thus, the trigger-clamp 500 can serve two purposes. It can be a safety clamp supplementing the primary method of clamping the reel 810 to the rod 800 or it can be that primary method. In either case, the base 807 is typically of stamped metal in the shape of a partial cylinder in which one side of the cylindrical handle 805 nests. An opposite side of the cylindrical handle 805 nests in the cylindrical recess 515 of the trigger-clamp 500 so that the handle 805 is sandwiched between the recess 515 and the base 807. While the base 807 is typically attached to the reel 810 with a stamped metal cross-bar 911 having bent metal tabs, or the like, at the ends, which may fail and cause the reel 810 to come off the base 807 and be lost, a typical reel 810 also includes a pair of structurally sound stationary cross-bars 812, 814 firmly connected between a pair of side members 900, 905 of the reel 810 as with screws. The cross-bars 812, 814 and the side members 900, 905 as depicted are typical of the usual fishing reel.

The trigger-clamp 500 of this invention achieves its novel benefits by the use of a fastening system which extends between the trigger-clamp 500 and the cross-bars 812, 814. In one method as depicted in FIGS. 8 and 9, a pair of threaded plates 910 span the pair of cross-bars 812, 814 on either side of the reel 810. Each plate 910 includes a planar body 912 having a threaded screw hole therethrough. A pair of wings 914 integrally formed with and extending up and out from the planar body 912 rest on respective ones of the pair of cross-bars 812, 814 facing away from the trigger-clamp 500. A pair of bolts 920, 925 having threaded shanks 920a, 925a respectively, are inserted through the holes 520 and 525 in the trigger fastening base 510 and are tightly threaded in respective ones of the screws holes in the planar bodies 912 of the threaded plates 910 so as to draw the plates 910 and the base 510 closer together. The holes 520, 525 are large enough for the shanks 920a, 925 a to pass through but too small for the heads 920b, 925b to pass through, so that the bolts 920, 925 are arrested as soon as their heads 920b, 925b nest inside the head-receiving holes 520a, 525a. Accordingly, the bolts 920 and 925 tightly compress the handle 805 between the half-cylindrical recess 515 of the trigger-clamp 500 and the partial cylinder-shaped fastening base 807 of the reel 810. Thus, the bolts 920 and 925 not only tightly hold the trigger-clamp 500 to the handle 805; but also, supplement the fastening grips 809 and 809b in holding the reel 810 to the handle 805. In this way, the above-mentioned stresses of casting and the like which normally are absorbed by the base 807 and cross-bar 911 are, instead, absorbed by the cross-bars 812, 814. Because of this, the likelihood of the base 807 and cross-bar 911 breaking is greatly reduced; and, should they break, the reel 810 will be held against loss by the trigger-clamp 500 and bolts 920, 925 as connected to the reel 810 with the plates 910.

Of course, other variations and modifications may be made to the invention within the scope and spirit thereof. For example, in an alternative embodiment, the threaded plate 910 and the straight bolts 920 and 925 are replaced by a pair of "J" bolts hooked over one of the cross-bars 812 or 814 with their threaded ends passed through the holes 520 and 525 in the trigger fastening base 510 and held by nuts threaded thereon.

Wherefore, having thus described the invention, what is claimed is:

1. In a fishing rod having a handle member supporting a fishing reel having a reel body with a support base extending between the reel body and the handle member, the improvement comprising:
   (a) a separate trigger;
   (b) means for removably fastening said trigger to said reel body so as to compress said rod handle member between said reel support base and said trigger and firmly hold both said trigger and said reel to said rod handle member;

wherein:
   (c) said rod handle member is cylindrical;
   (d) said trigger comprises:
       (1) a trigger base, and
       (2) a finger grip extending out from said trigger base in a first direction, said trigger base having a partial cylindrical recess in a side thereof opposite said finger grip;
   (e) said rod handle member is nested between said partial cylindrical reel support base and said partial cylindrical recess;
   (f) said means for fastening comprises a pair of bolts coupled between said trigger base and a structural cross-member of said reel body.

2. The improvement of claim 1 wherein:
said trigger base comprises a pair of wings extending in opposite directions therefrom, each of said wings having a hole through which a respective one of said bolts is inserted.

3. The improvement of claim 2 wherein:
said bolts each has a shank fitting within each of said holes and a head larger than each of said holes, said bolts inserted in said holes toward said reel so that each shank thereof is connected to said reel.

4. The improvement of claim 3 wherein:
said reel body includes a pair of spaced side members connected together by a plurality of stationary cross-bars, said shanks being connected to at least one of said cross-bars.

5. The improvement of claim 4 wherein said shanks are threaded and said means for fastening further comprises:
a pair of plates each having a body with a hole therethrough having an associated threaded member engaged with one of said threaded shanks and a pair of opposed wings extending outwardly from said body, said wings resting on respective ones of said cross bars on sides thereof opposite said trigger, whereby said rod member is further compressed between said trigger base and said reel support base upon tightening of said bolts.

6. An add-on trigger assembly for a fishing rod having a handle member supporting a fishing reel having a reel body with a support base extending between the reel body and the handle member, said add-on trigger comprising:
   (a) a trigger body; and
   (b) means for removably fastening said trigger body to a structural cross-member of said reel body so as to compress said rod handle member between said fishing reel support base and said trigger body and firmly hold both said trigger body and said reel body to said rod handle member;
wherein:
   (c) said rod handle member is cylindrical;
   (d) said trigger body comprises:
       (1) a trigger base,
       (2) a finger grip extending out from said trigger base in a first direction, and
       (3) a partial cylindrical recess in said trigger base in a side thereof opposite said finger grip rod handle member nests between said partial cylindrical reel base and said partial cylindrical recess;
   (e) said means for fastening comprises a pair of bolts coupled to said trigger base and to said reel; and wherein,
   (f) said trigger base comprises a pair of wings extending in opposite directions therefrom, each of said wings having a hole through which a respective one of said bolts is inserted.

7. The improvement of claim 6 wherein:
said reel body comprises a pair of side members coupled together by a plurality of stationary cross-bars comprising structural cross-members of said reel, said bolts being coupled to at least one of said cross-bars.

8. The improvement of claim 7 wherein:
said means for fastening further comprises a threaded plate having a body threadedly engaged with said bolts and opposed wings extending outwardly from said body, said wings resting on respective ones of said cross-bars on sides thereof opposite said trigger, whereby said rod member is further compressed between said trigger base and said reel support base upon tightening of said bolts.

9. In a fishing rod having a handle and a reel attached to said handle, the improvement comprising:
(a) a trigger having a body disposed on said handle on a side thereof opposite said reel and a finger grip extending outwardly in a direction away from said handle; and,
(b) a plurality of bolts inserted through said trigger body, one end of each of said bolts being engaged with said trigger body and the other end of each of said bolts being connected to a structural member of said reel, at least one end of each of said bolts being threaded, whereby said rod handle is compressed between said trigger body and said reel upon said bolts being tightened.

10. The improvement of claim 9 wherein:
(a) said other end of each of said bolts is threaded, and further comprising,
(b) plate means for threadedly coupling said bolts to said reel.

11. The improvement of claim 10 wherein:
(a) said structural member of said reel comprises a plurality of cross-bars connecting a pair of side members; and,
(b) said plate means are disposed on said cross-bars on sides thereof opposite said trigger body.